(12) United States Patent
Salmon et al.

(10) Patent No.: US 8,523,107 B2
(45) Date of Patent: Sep. 3, 2013

(54) FUSELAGE MOUNTED LANDING GEAR

(75) Inventors: James Jason Salmon, Kirkland, WA (US); Sergey D. Barmichev, Bothell, WA (US); Michael Allan Long, Freeland, WA (US)

(73) Assignee: The Boeing Company, Chicago, IL (US)

( * ) Notice: Subject to any disclaimer, the term of this patent is extended or adjusted under 35 U.S.C. 154(b) by 273 days.

(21) Appl. No.: 12/722,848

(22) Filed: Mar. 12, 2010

(65) Prior Publication Data

US 2012/0168561 A1 Jul. 5, 2012

(51) Int. Cl.
*B64C 25/10* (2006.01)

(52) U.S. Cl.
USPC .................................. 244/102 A; 244/102 R

(58) Field of Classification Search
USPC ................. 244/100 R, 102 R, 102 A, 102 SL
See application file for complete search history.

(56) References Cited

U.S. PATENT DOCUMENTS

| | | | |
|---|---|---|---|
| 3,285,541 A | | 11/1966 | Fehring et al. |
| 4,406,432 A | | 9/1983 | Dornier, Jr. et al. |
| 4,412,665 A | * | 11/1983 | Kramer et al. ............ 244/102 R |
| 4,638,962 A | * | 1/1987 | Gunter et al. ................. 244/203 |
| 5,086,995 A | * | 2/1992 | Large ........................ 244/102 R |
| 5,478,030 A | | 12/1995 | Derrien et al. |
| 6,173,920 B1 | * | 1/2001 | Meneghetti ................ 244/100 R |
| 6,805,320 B2 | * | 10/2004 | Derrien et al. ............. 244/102 A |
| 2008/0142634 A1 | * | 6/2008 | Moe et al. ..................... 244/1 N |
| 2009/0057484 A1 | * | 3/2009 | White ........................ 244/102 A |
| 2010/0237188 A1 | * | 9/2010 | Genty de la Sagne et al. .......................... 244/102 R |

FOREIGN PATENT DOCUMENTS

| | | |
|---|---|---|
| DE | 2924742 A1 | 1/1981 |
| EP | 1041000 A2 | 10/2000 |
| FR | 2800705 A1 | 5/2001 |

OTHER PUBLICATIONS

PCT search report dated Feb. 1, 2013 regarding application PCT/US2012/028314, applicant's reference, applicant The Boeing Company, 11 pages.

* cited by examiner

*Primary Examiner* — Tien Dinh
*Assistant Examiner* — Jamie S Stehle
(74) *Attorney, Agent, or Firm* — Yee & Associates, P.C.

(57) ABSTRACT

A landing gear for an aircraft. The landing gear may have a wheel/truck assembly, an oleo strut/support frame for supporting the wheel/truck assembly, and a retraction assembly attached to the oleo strut/support frame, the retraction assembly for moving the landing gear between a deployed position and a retracted position. The retraction assembly may have a pivoting trunnion brace attached to the oleo strut/support frame and to a fuselage of the aircraft for positioning the wheel/truck assembly, the oleo strut/support frame and the retraction assembly at least substantially fully within the fuselage of the aircraft in the retracted position.

16 Claims, 18 Drawing Sheets

FUSELAGE MOUNTED LANDING GEAR

BACKGROUND INFORMATION

1. Field

The present disclosure relates generally to aircraft, and more particularly, to landing gear for aircraft. Still more particularly, the present disclosure relates to a fuselage mounted landing gear for aircraft and to a method for retracting a fuselage mounted landing gear.

2. Background

An effective landing gear design for an aircraft should provide an optimum combination of sufficient overall functional strength, a geometric arrangement for adequate ground maneuvering and landing stability, a lowest possible weight, and a lowest possible drag when retracted. On any high wing or other aircraft in which the main landing gear is not easily stored or cannot be attached to a wing of the aircraft, at least one of the above goals may be at risk. In the case of fuselage mounted landing gear configurations, for example, the low drag goal may be compromised.

An aircraft's main landing gear must be placed sufficiently outboard of the side of the body of the aircraft to enhance stability and prevent wallowing during ground maneuvers. On low wing aircraft this is usually not a problem because a gear post can be attached to the wing, outboard of the side of the body of the aircraft. When the gear is extended, the gear must be far enough out to ensure stability. On an aircraft that cannot use wing mounted landing gear, the landing gear typically must be mounted to and completely stored within the body of the aircraft.

Fuselage mounted landing gear (FMLG) designs may be heavy and cause significant drag. Typically, in order for the landing gear to be sufficiently outboard, the body frame of the landing gear is extended beyond the side of the body of the aircraft. The top of gear struts are attached to trunnions mounted to these frames. The gear assembly pivots around these trunnions and is stowed inside the body.

In order to minimize the drag associated with the increase in frontal area, a fairing is wrapped around the external structure, driving additional structural weight. Despite streamlining efforts, total drag is still dependent upon frontal area and surface area, both of which are increased by the fairings.

Large fairings increase aircraft wetted area and frontal area, and, accordingly, the parasite drag grows, which may effect the efficiency of the aircraft. Moreover, for middle wing configurations, the main landing gear fairing may become close to the lower wing surface, which may create additional interference drag.

Another feature which is typical for most current FMLG designs is that the retracted landing gear occupies bays between fuselage frames to adequately accommodate a big wheel truck. This has an effect on available internal fuselage volume, which could otherwise be used for other systems or for additional cargo space.

Therefore, it would be advantageous to have a landing gear for an aircraft that takes into account one or more of the issues discussed above, as well as possibly other issues.

SUMMARY

An embodiment of the present disclosure provides a landing gear for an aircraft. The landing gear may have a wheel/truck assembly, an oleo strut/support frame for supporting the wheel/truck assembly, and a retraction assembly attached to the oleo strut/support frame, the retraction assembly for moving the landing gear between a deployed position and a retracted position. The retraction assembly may have a pivoting trunnion brace attached to the oleo strut/support frame and to a fuselage of the aircraft for positioning the wheel/truck assembly, the oleo strut/support frame and the retraction assembly at least substantially fully within the fuselage of the aircraft in the retracted position.

A further embodiment of the present disclosure provides a landing gear for an aircraft. The landing gear may have a wheel/truck assembly, an oleo strut/support frame for supporting the wheel/truck assembly, and a retraction assembly attached to the oleo strut/support frame for moving the landing gear between a deployed position outwardly of a fuselage of the aircraft, and a retracted position. The retraction assembly may have a pivoting trunnion brace attached to the oleo strut/support frame and to the fuselage for positioning the wheel truck assembly, the oleo strut/support frame and the retraction assembly at least substantially fully within the fuselage in the retracted position.

Yet a further embodiment of the present disclosure provides a method for retracting a wheel truck assembly of an aircraft from a deployed position to a retracted position. A linkage is provided between an oleo strut/support frame that supports the wheel truck assembly, and a fuselage of the aircraft. The linkage is stabilized with a pair of folding lock links when the wheel truck assembly is in the deployed position. The pair of folding lock links is unlocked to release the linkage, and a retract actuator is operated to rotate the oleo strut/support frame relative to the fuselage until the wheel truck assembly is at least substantially fully within the fuselage of the aircraft in the retracted position.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
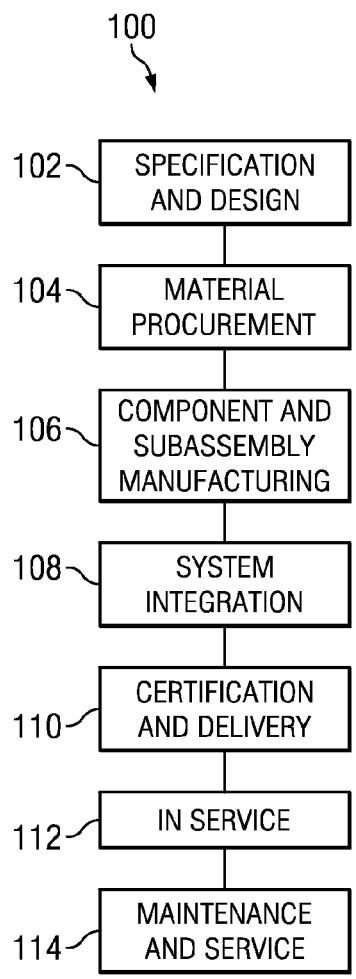
FIG. 1 is an illustration of an aircraft manufacturing and service method in accordance with an advantageous embodiment.
Figure 2:
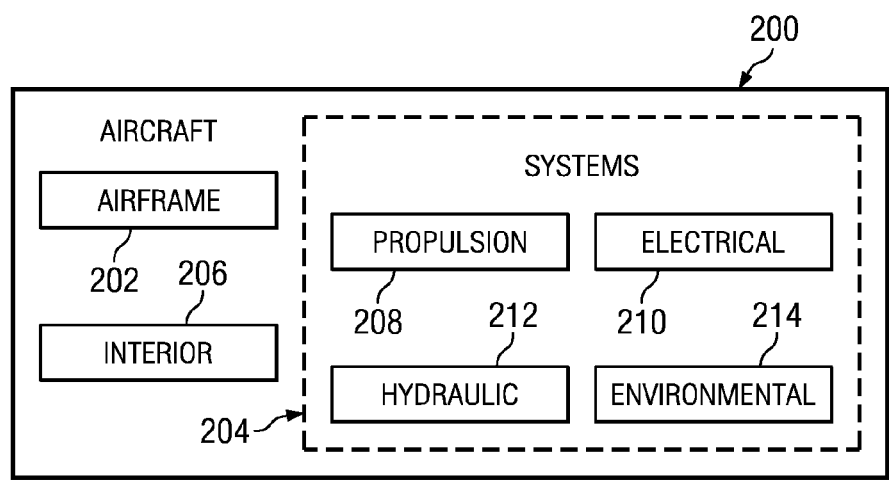
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

Figure 3:
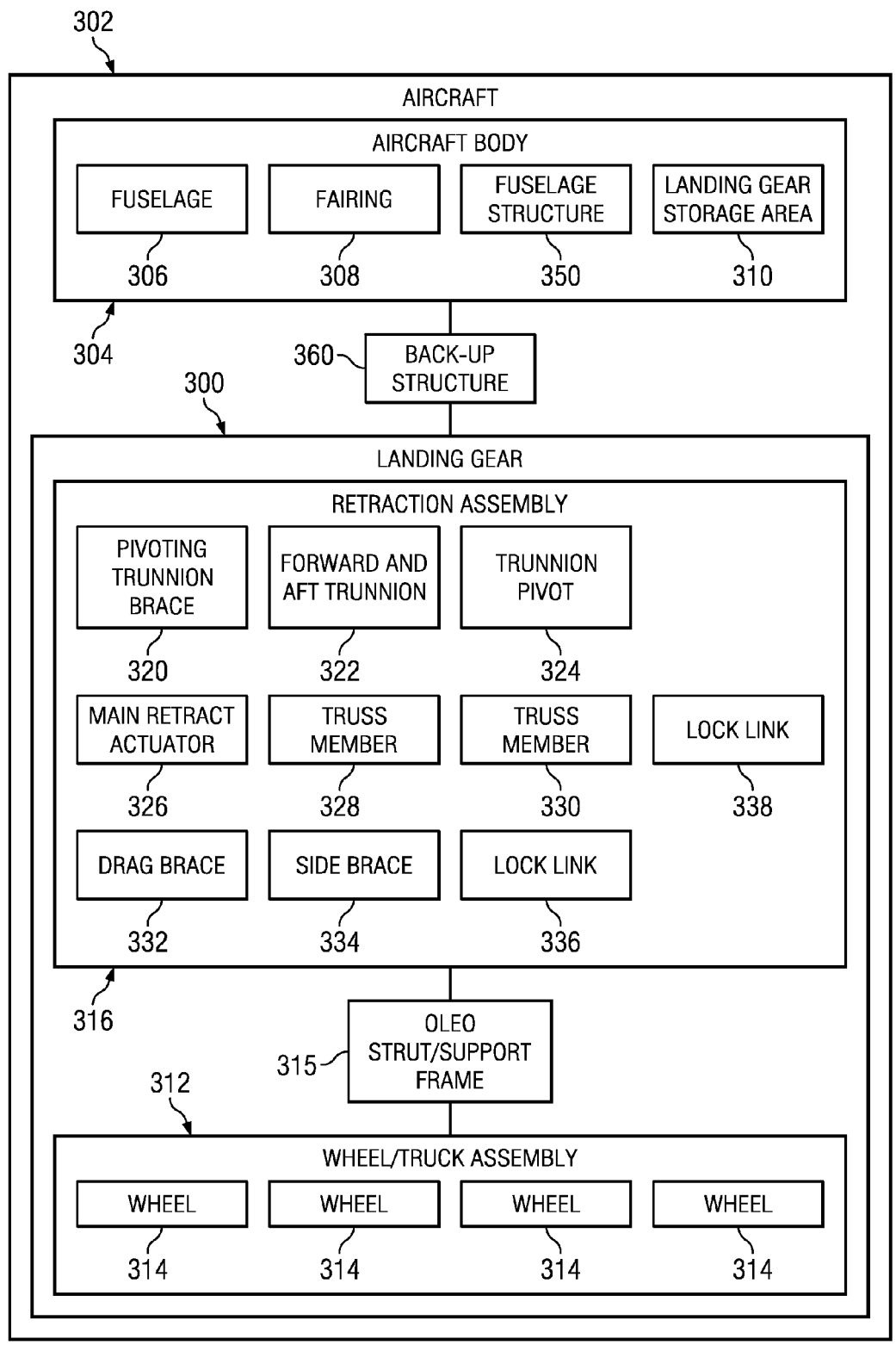
FIG. 3 is an illustration of a landing gear for an aircraft in accordance with an advantageous embodiment.

With reference now to FIG. 3, an illustration of a landing gear for an aircraft is depicted in accordance with an advantageous embodiment. The landing gear is generally designated by reference number 300, and may be a fuselage mounted landing gear (FMLG) that is mounted to and stored within an aircraft body 304 of an aircraft 302. Aircraft 302 may, for example, be implemented as aircraft 200 in FIG. 2. Aircraft body 304 may be fuselage 306 alone, or aircraft body 304 may be fuselage 306 expanded somewhat by fairing 308 to define a landing gear storage area 310 for storing landing gear 300 when the landing gear 300 is in a stowed position.

Landing gear 300 may be one of a plurality of landing gear mounted to aircraft 302, and may be moveable between a deployed position while on the ground and during take-off and landing, and a retracted position when stored in landing gear storage area 310 during flight.

Landing gear 300 may have a wheel/truck assembly 312, a retraction assembly 316 and an oleo strut/support frame 315 connecting the wheel/truck assembly 312 to the retraction assembly 316. Wheel/truck assembly 312 may have a plurality of wheels 314, for example and without limitation, 2-6 wheels. Retraction assembly 316 is attached to wheel truck assembly 312 and to aircraft body 304.

Retraction assembly 316 may include a number of components including a pivoting trunnion brace 320, a forward and aft trunnion 322, a trunnion pivot 324, at least one main retract actuator 326, a set of truss members 328 and 330, a drag brace 332, a side brace 334, and a pair of lock links 336 and 338. The various components of retraction assembly 316 function together to move wheel/truck assembly 314 and landing gear 300 as a whole between the deployed position and the retracted position. When in the stowed position, landing gear assembly 300 may be stored in landing gear storage area 310 within aircraft body 304, either fully within fuselage 306 or, in some cases, within fuselage 306 as expanded somewhat by fairing 308.

As also illustrated in FIG. 3, fuselage structure, generally designated by reference number 350, may be provided to releasably secure landing gear 300 within storage area 310, and backup structure, generally designated by reference number 360, may be provided to attach the landing gear 300 to the aircraft body 304.

Figure 4:
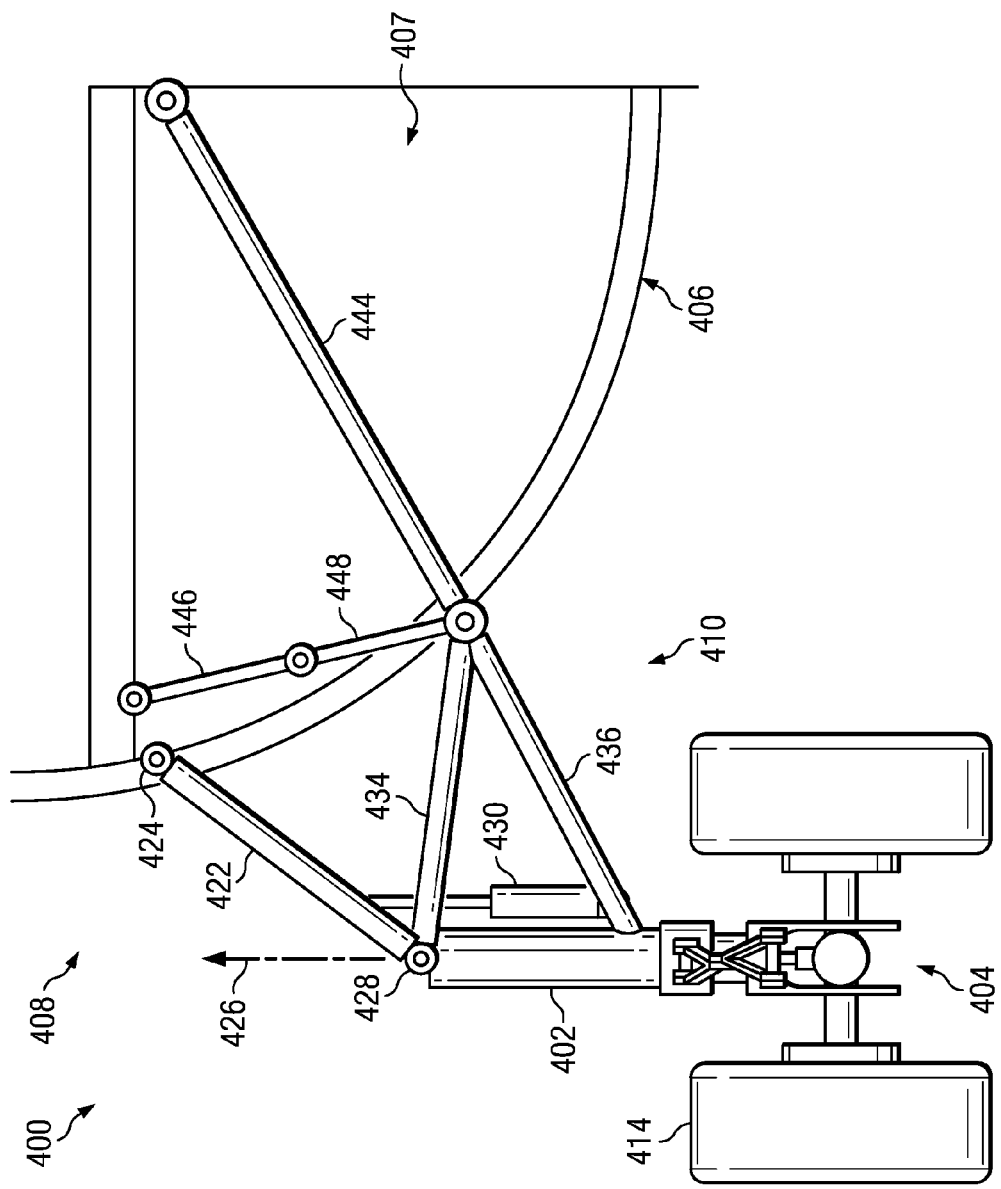
FIG. 4 is an illustration of a rear plan view of a landing gear for an aircraft in accordance with an advantageous embodiment.
Figure 5:
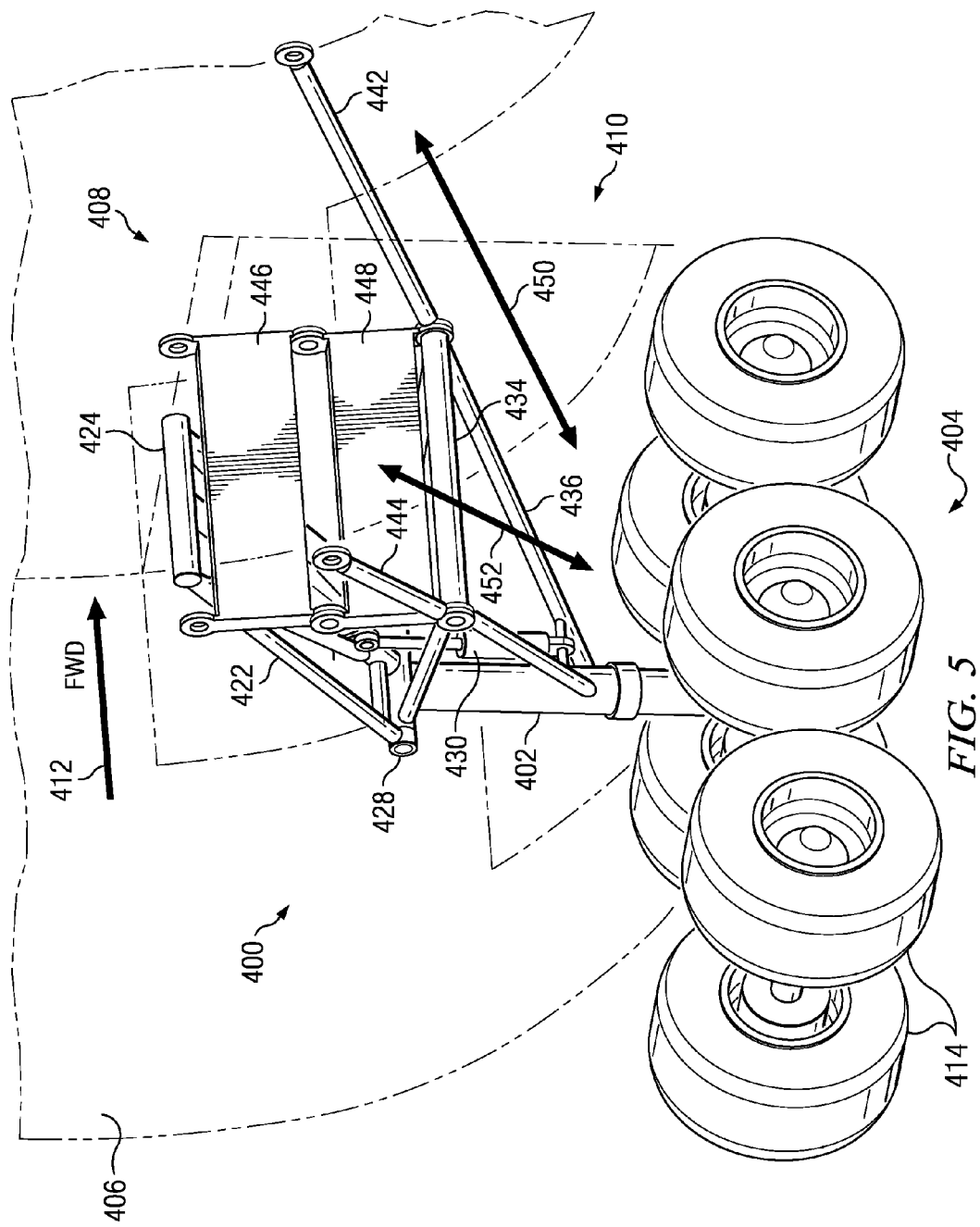
FIG. 5 is an illustration of a side plan view of the landing gear of FIG. 4 looking outwardly from the aircraft.
Figure 6:
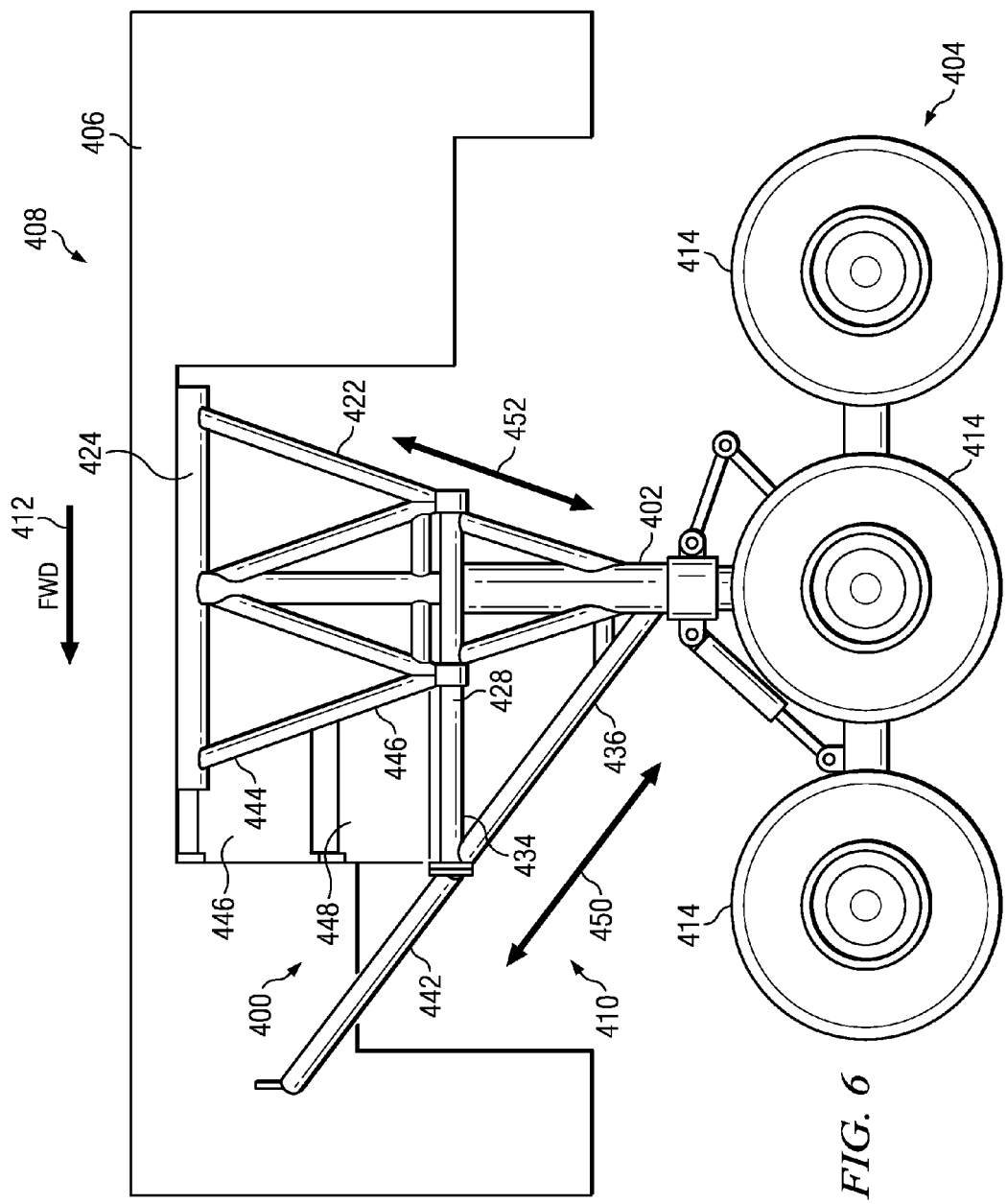
FIG. 6 is an illustration of a side plan view of the landing gear of FIG. 4 looking inwardly toward the aircraft.

Referring now to FIGS. 4-6, illustrations of a landing gear for an aircraft are depicted in accordance with an advantageous embodiment. In particular, FIG. 4 is an illustration of a rear plan view of a landing gear for an aircraft in accordance with an advantageous embodiment, FIG. 5 is an illustration of a side plan view of the landing gear of FIG. 4 looking outwardly from the aircraft, and FIG. 6 is an illustration of a side plan view of the landing gear of FIG. 4 looking inwardly toward the aircraft.

The landing gear is generally designated by reference number 400, and may be implemented as landing gear 300 in FIG. 3. Landing gear 400 may be a fuselage mounted landing gear (FMLG), and may include an oleo strut/frame support 402 for supporting a wheel/truck assembly 404, and a retraction assembly, generally designated by reference number 410, for moving the oleo strut/frame support 402 and the wheel/truck assembly 404 between a deployed position for use and a retracted position for storage in landing gear storage area 407 in fuselage 406 of the aircraft 408. FIGS. 4-6 illustrate landing gear 400 in a deployed position for use. Arrows 412 in FIGS. 5 and 6 illustrate the direction of the front of aircraft 408.

Wheel/truck assembly 404 may include a plurality of wheels 414. In the advantageous embodiment illustrated in FIGS. 4-6, wheel/truck assembly 404 has six wheels 414. This is intended to be exemplary only as wheel truck assembly 404 may have a different number of wheels, for example, two wheels or four wheels.

A wheel/truck assembly of an aircraft should be placed sufficiently outboard of the side of the body of the aircraft so that the aircraft will not tip over during ground maneuvering, and will remain stable throughout all aircraft operations. On an aircraft where it is not practical to use wing mounted landing gear, the landing gear is usually mounted to and completely stored within the body of the aircraft (as will be explained hereinafter, the body of the aircraft may include fuselage 406 alone or fuselage 406 as expanded by a fairing). Retraction assembly 410 illustrated in FIGS. 4-6 enables wheel/truck assembly 404 to be moved between a deployed position that is sufficiently outboard of fuselage 406 to meet all tip-over requirements and, at the same time, enables complete or substantially complete storage of the landing gear 400 within fuselage 406 when the landing gear 400 is in the retracted position.

Retraction assembly 410 may include a pivoting trunnion brace 422 which is positioned at an angle to the vertical when the landing gear is in the deployed position shown in FIGS. 4-6. The upper end of pivoting trunnion brace 422 may be attached to fuselage 406 by forward and aft trunnion 424 separated from one another enough to handle the torsional loads about vertical axis 426 (illustrated in FIG. 4) of the landing gear 400. The lower end of pivoting trunnion brace 422 may be attached to oleo strut/frame support 402 by trunnion pivot 428.

A main retract actuator 430 connects two pivot points on pivoting trunnion brace 422 and on oleo strut/support frame 402, and controls the angle between the pivoting trunnion brace 422 and the oleo strut/support frame 402. Oleo strut/support frame 402 is also supported by a set of truss members 434 and 436. Truss members 434 and 436 are supported by a drag brace 442 and a side brace 444 which are held on-center via a pair of folding lock links 446 and 448.

When landing gear 400 is deployed, as shown in FIGS. 4-6, it is far enough outboard of the side of fuselage 406 to ensure stability during taxi and landing. Landing gear 400 also provides stable 3-dimensional support which effectively resists loads and moments from any direction. The drag brace 442 forms a straight drag load path from the oleo strut/support frame 402 to the fuselage 406 as shown by arrow 450 in FIGS. 5 and 6, and the side brace 444 forms a straight side load path from the oleo strut/support frame 402 to the fuselage 406 as shown by arrow 452 in FIGS. 5 and 6.

When landing gear 400 is retracted by operation of retract actuator 430, landing gear 400 is retracted well within fuselage 406 when the lock links 446 and 448 are unlocked. The size and weight of landing gear 400 is minimized by limiting variation in the mechanical advantage of the retract actuator.

Figure 7:
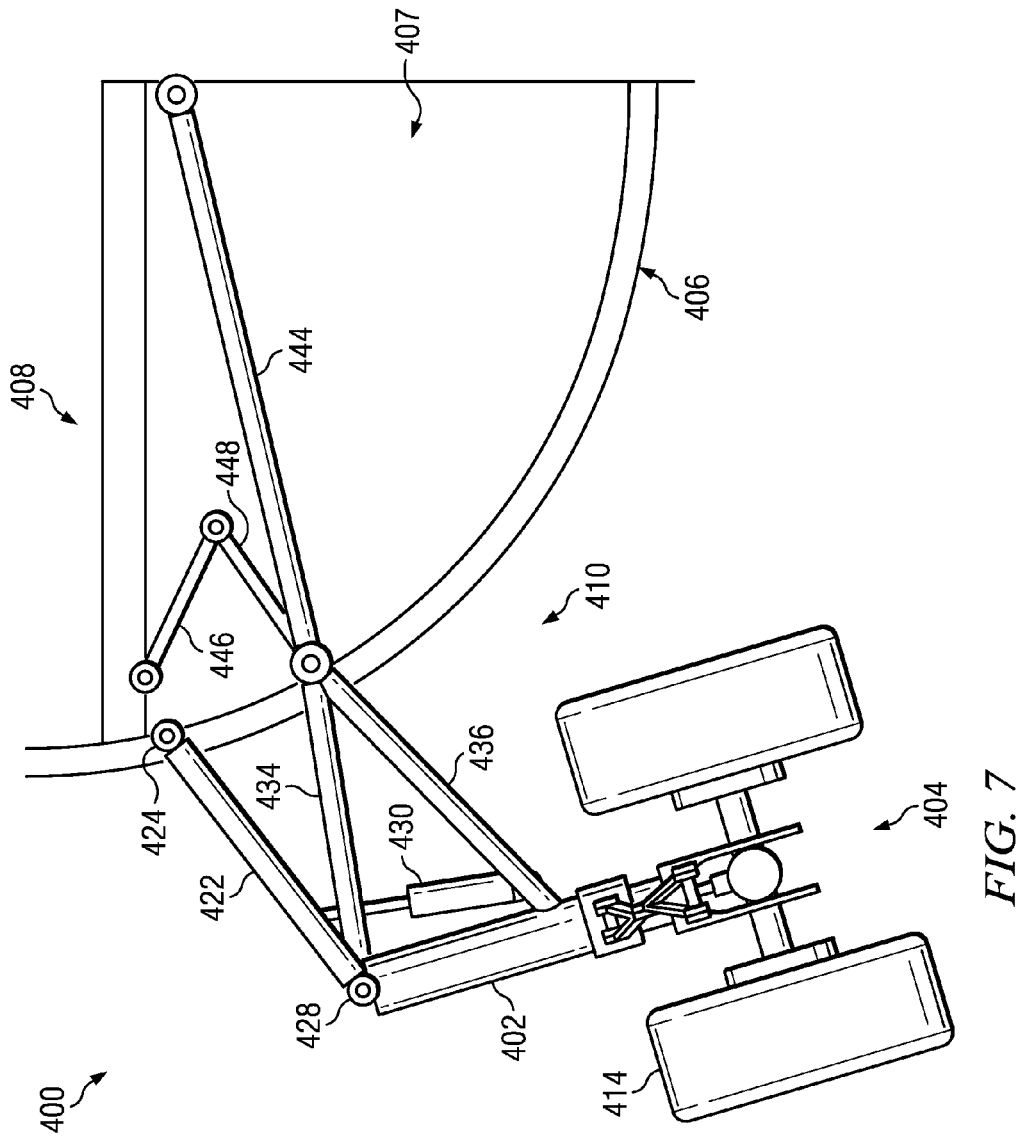
FIGS. 7 and 8 are illustrations of a rear plan view of the landing gear of FIGS. 4-6 in first and second stages, respectively, of being retracted; in accordance with an advantageous embodiment.
Figure 8:
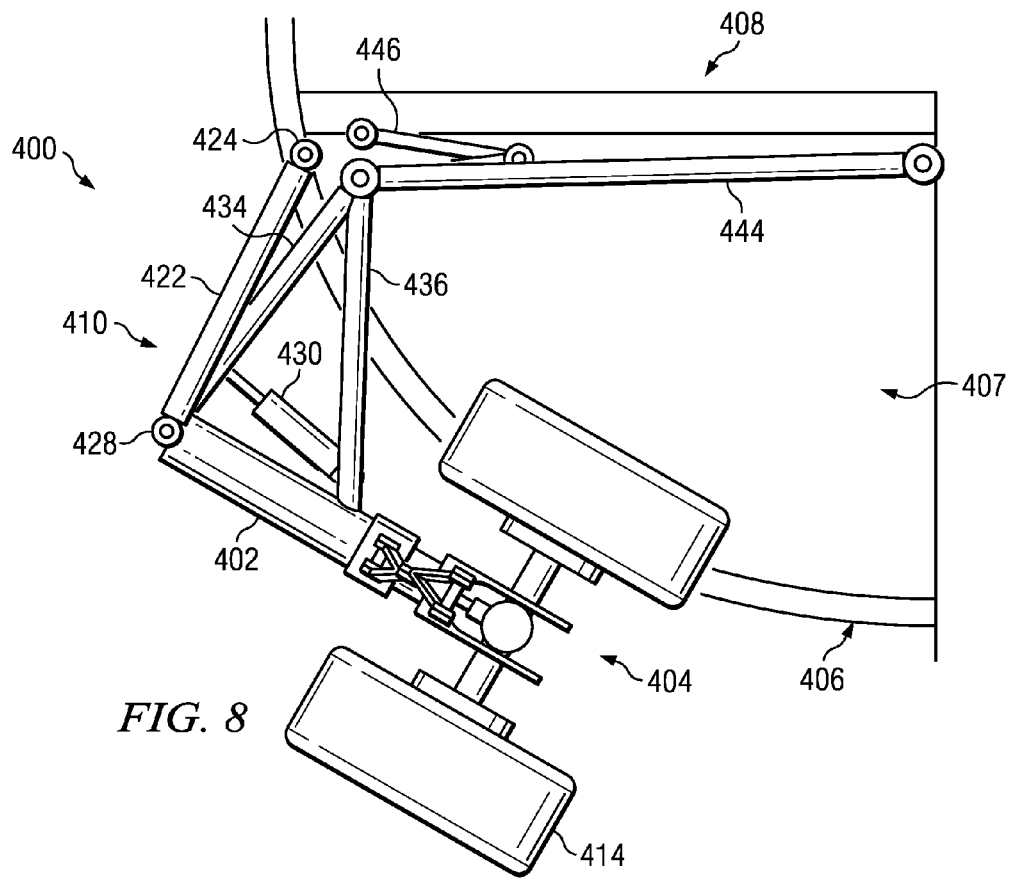
Figure 9:
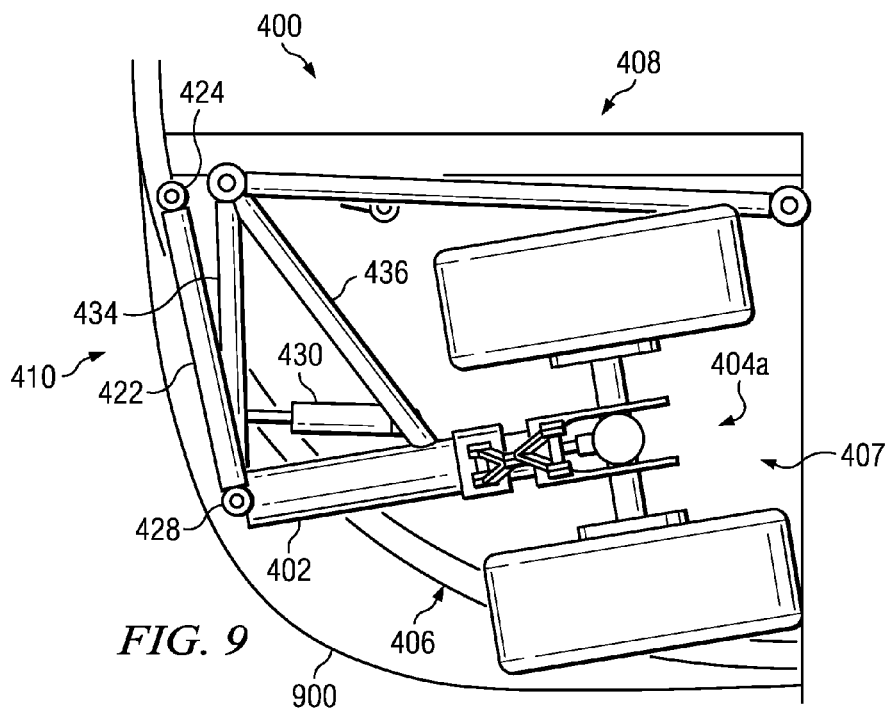
FIG. 9 is an illustration of a rear plan view of the landing gear of FIGS. 4-6 in a fully retracted position in accordance with an advantageous embodiment.

Referring now to FIGS. 7-9, illustrations of the landing gear of FIGS. 4-6 are depicted during retraction and when fully retracted in accordance with an advantageous embodiment. In particular, FIGS. 7 and 8 are illustrations depicting a rear plan view of the landing gear of FIGS. 4-6 in first and second stages, respectively, of being retracted in accordance with an advantageous embodiment, and FIG. 9 is an illustration depicting a rear plan view of the landing gear of FIGS. 4-6 in a fully retracted position in accordance with an advantageous embodiment.

During the retraction process, as shown in FIGS. 7 and 8, lock links 446 and 448 unlock via a lock actuator (not shown) allowing the main retract actuator 430 to retract causing the oleo strut/support frame 402 to rotate relative to the aircraft body 406 until the wheel/truck assembly 404 and the oleo strut/support frame 402 are fully stowed and almost entirely within the fuselage 406 where a separate uplock mechanism (not shown) holds the landing gear in the up and locked position, as shown in FIG. 9. Although not illustrated in the figures, a rotary actuator may be provided, if desired, to assist in placing the landing gear in a fully stowed position.

As also shown in FIG. 9, a fairing 900 may be provided to encompass the retracted landing gear, when necessary. In accordance with an advantageous embodiment, however, the fairing 900 may be much closer to fuselage 406 as compared to current fuselage mounted landing gear. Fairing 900 provides enough clearance for landing gear 400 and the retracted and spun and grown tire envelope 404a shown in FIG. 9, which represents the increased volume occupied by rotating thermally expanded tires.

Figure 10:
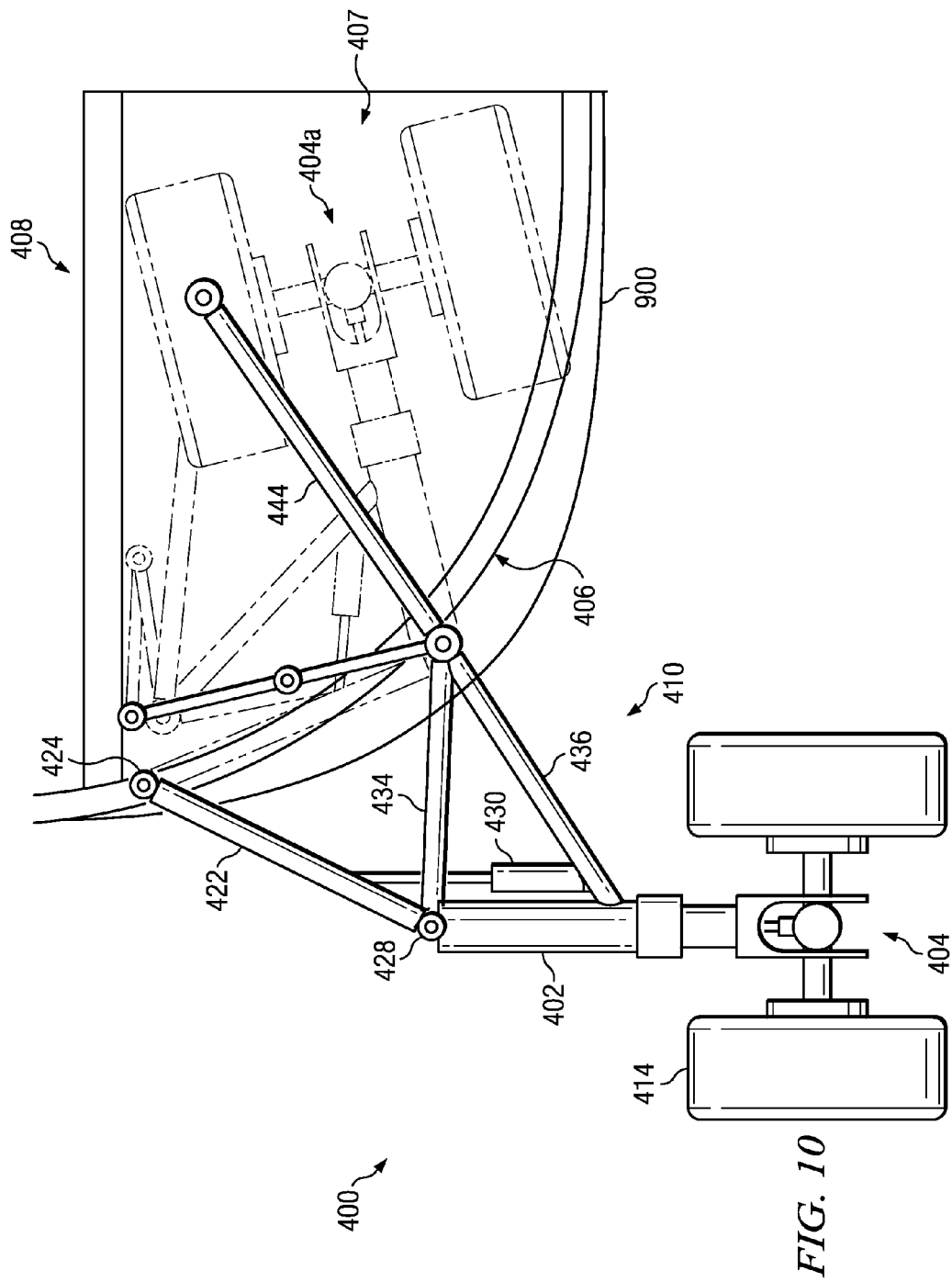
FIG. 10 is an illustration of a rear plan view of a landing gear fairing decrement for a wider fuselage aircraft than the aircraft in FIG. 9 in accordance with a further advantageous embodiment.

With reference now to FIG. 10, an illustration of a rear plan view of the landing gear of FIGS. 4-6 is depicted in accordance with a further advantageous embodiment In particular, for some aircraft for example, wider body aircraft, landing gear 400 may be stowed entirely inside the fuselage 406 without a fairing being required. FIG. 10 illustrates landing gear 400 much more fully stowed within the outline of a wider fuselage 406 such that fairing 900 illustrated in FIG. 9 is reduced significantly and may be unnecessary.

The reduction or complete elimination of landing gear fairing 900 may cause a significant reduction in fuselage parasite drag. This drag reduction may, for example and without limitation, be about 2 percent with a corresponding reduction in fuel burn.

Figure 11:
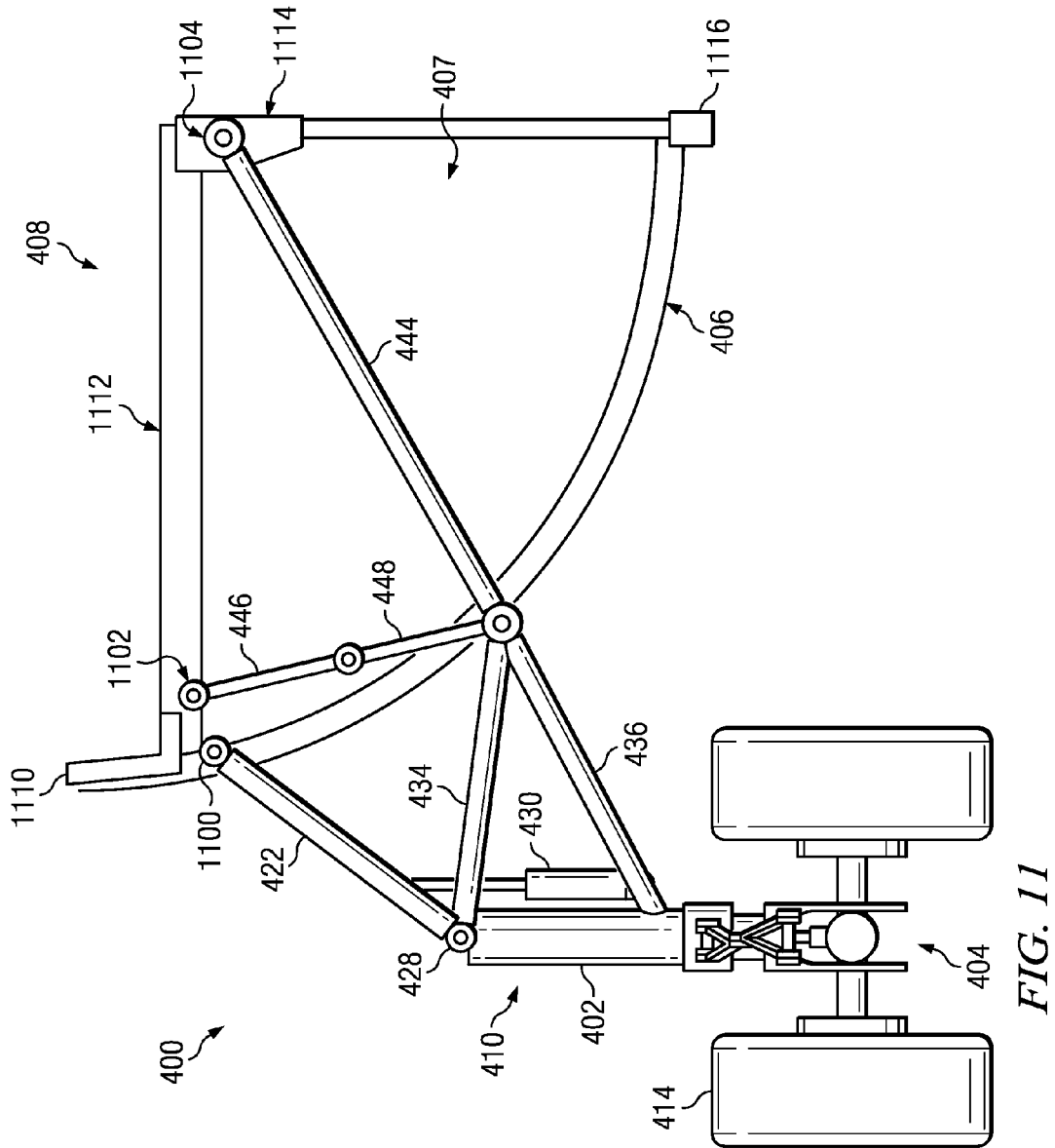
FIGS. 11 and 12 are illustrations that depict details of the landing gear backup structure of FIG. 4 in accordance with an advantageous embodiment.
Figure 12:
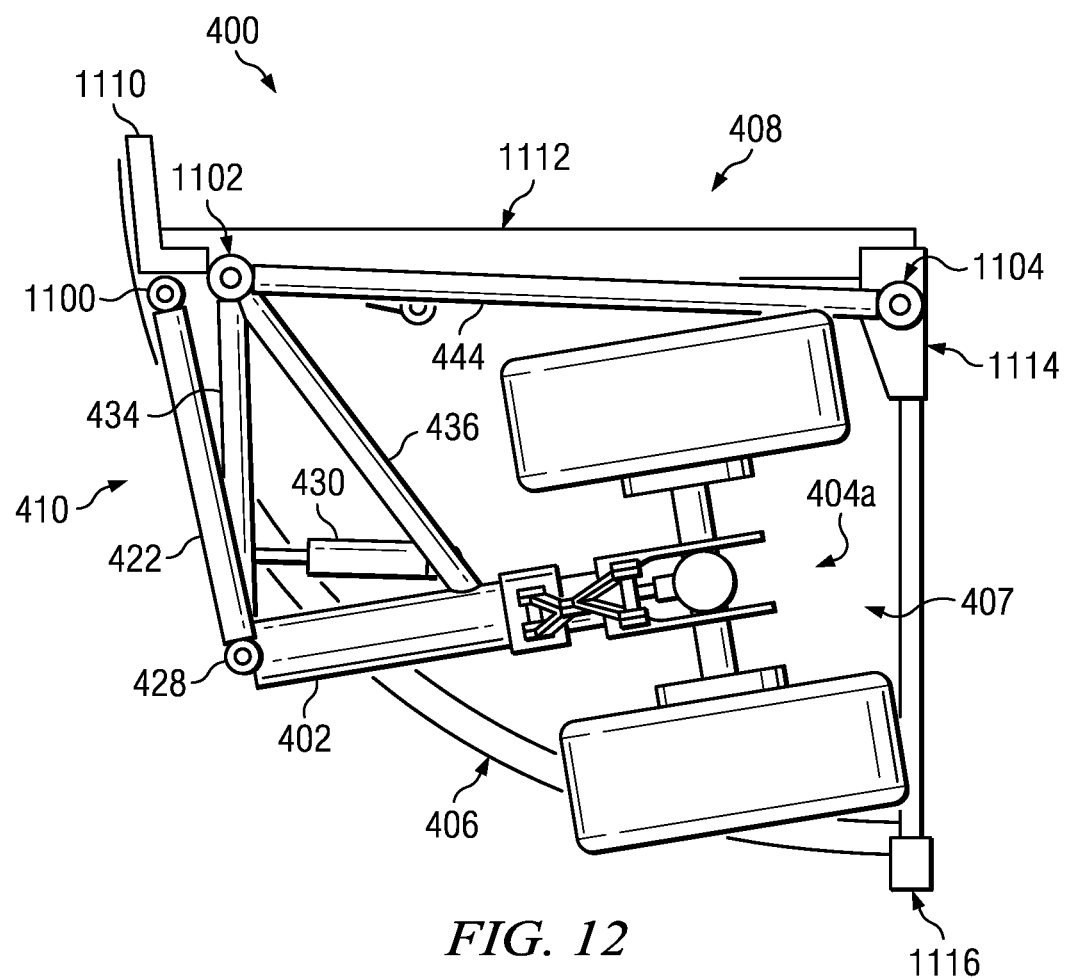

FIGS. 11 and 12 are illustrations that depict details of the landing gear backup structure of FIG. 4 in accordance with an advantageous embodiment. FIG. 11 illustrates landing gear 400 in a deployed position, and FIG. 12 illustrates landing gear 400 in a retracted position.

Landing gear 400 may require the installation of up to six pivot points onto fuselage 406. Reference number 1100 refers to the forward and aft trunnion axis points for pivoting trunnion brace 422. Reference number 1102 is a pivot axis for upper locking link 446, and reference number 1104 is a pivot axis point for drag brace 442 and for side brace 444. As shown in FIGS. 11 and 12, the configuration of landing gear 400 has a flexibility that allows points 1100, 1102 and 1104 to be located at almost any necessary location relative to the cross-section of fuselage 406.

As also shown in FIGS. 11 and 12, pivot lugs for pivots 1100 and 1102 may be installed on the longeron 1110, which is attached to an adequate amount of fuselage 406 frames and floor beams (not shown). Longeron 1110 plays a role of a loads trap structural element. Pivot 1102 can also be attached to the reinforced floor beam 1112. Pivots 1104 will be located on the reinforced upper area of a centerline bulkhead 1114. Together, with a keel beam 1116 and the floor structure 1112, this area can be designed strong enough to carry all operation load from the landing gear 400 to the fuselage 406.

Figure 13:
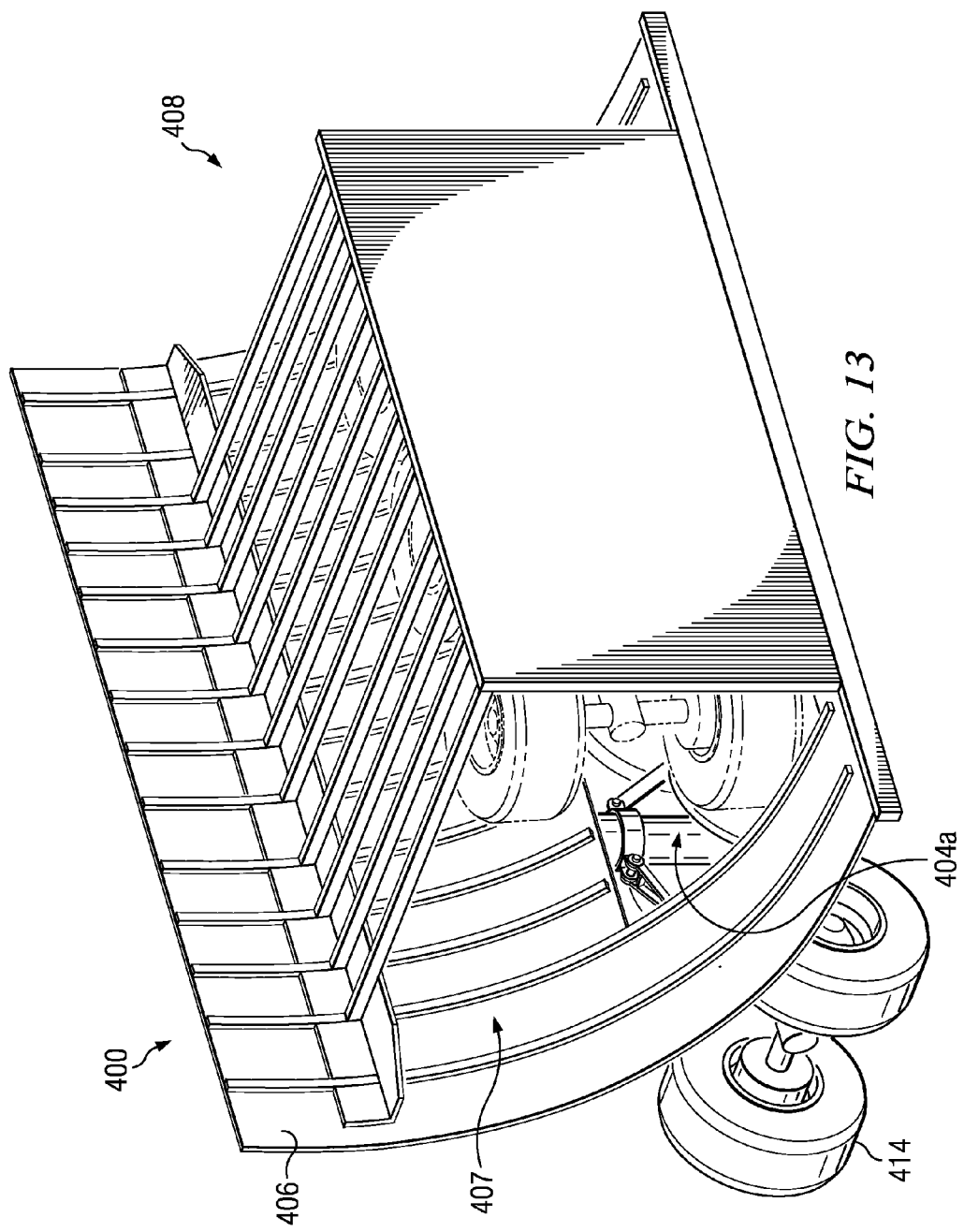
FIGS. 13 and 14 are illustrations that depict isometric views of the landing gear of FIGS. 4-6 integrated into a fuselage structure of an aircraft in accordance with an advantageous embodiment.
Figure 14:
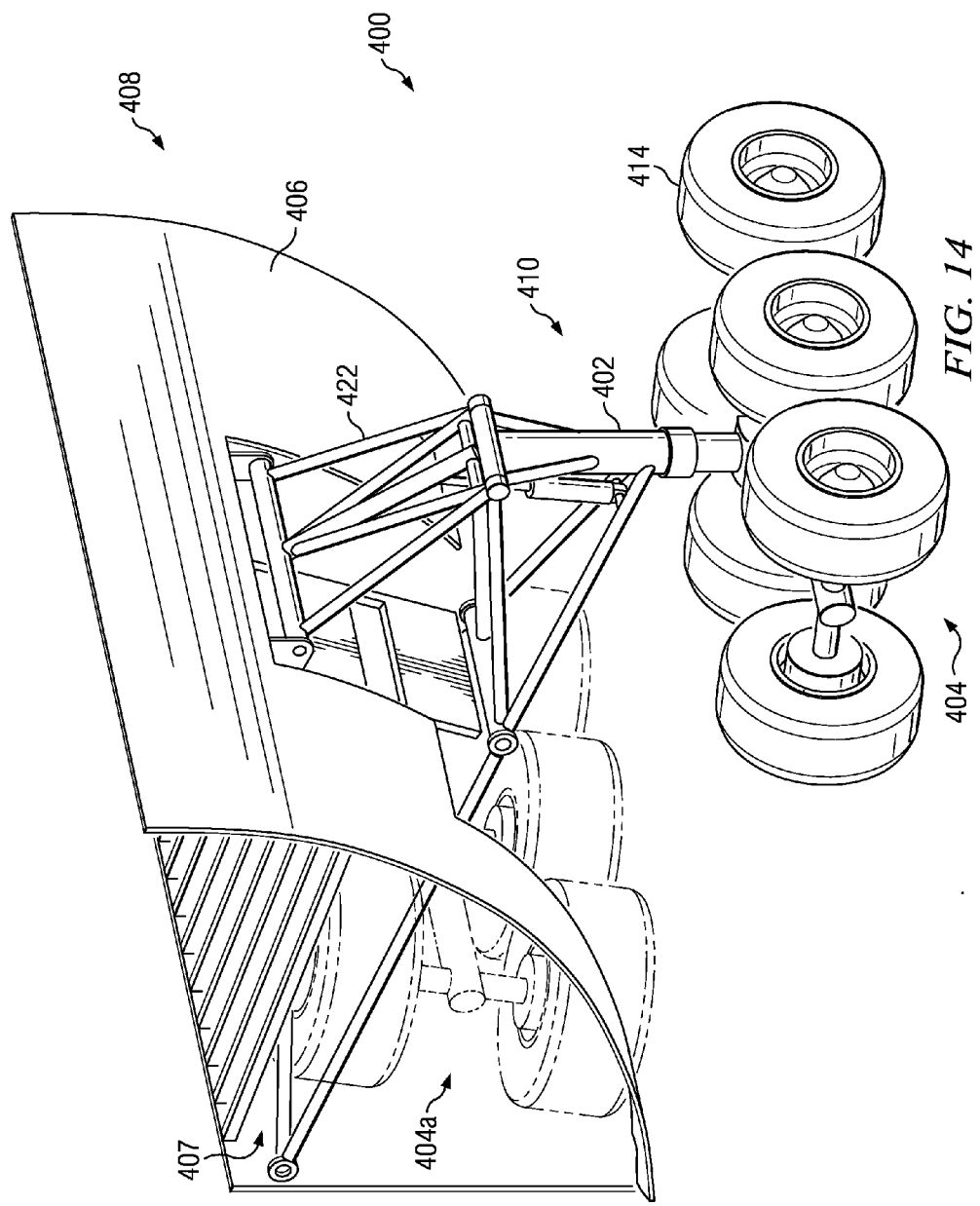

FIGS. 13 and 14 are illustrations that depict isometric views of the landing gear of FIGS. 4-6 integrated into a fuselage structure of an aircraft in accordance with an advantageous embodiment. In particular, FIG. 13 is an illustration of an isometric view of landing gear 400 integrated into a fuselage structure of an aircraft looking outwardly from the aircraft, and FIG. 14 is an illustration of an isometric view of landing gear 400 integrated into a fuselage structure of the aircraft looking inwardly toward the aircraft. Stringers, floor and wheel well aft and forward pressure bulkheads are not shown in FIGS. 13 and 14 for clarity. The skin of fuselage 406 is shown as semi-transparent, also for clarity.

Figure 15:
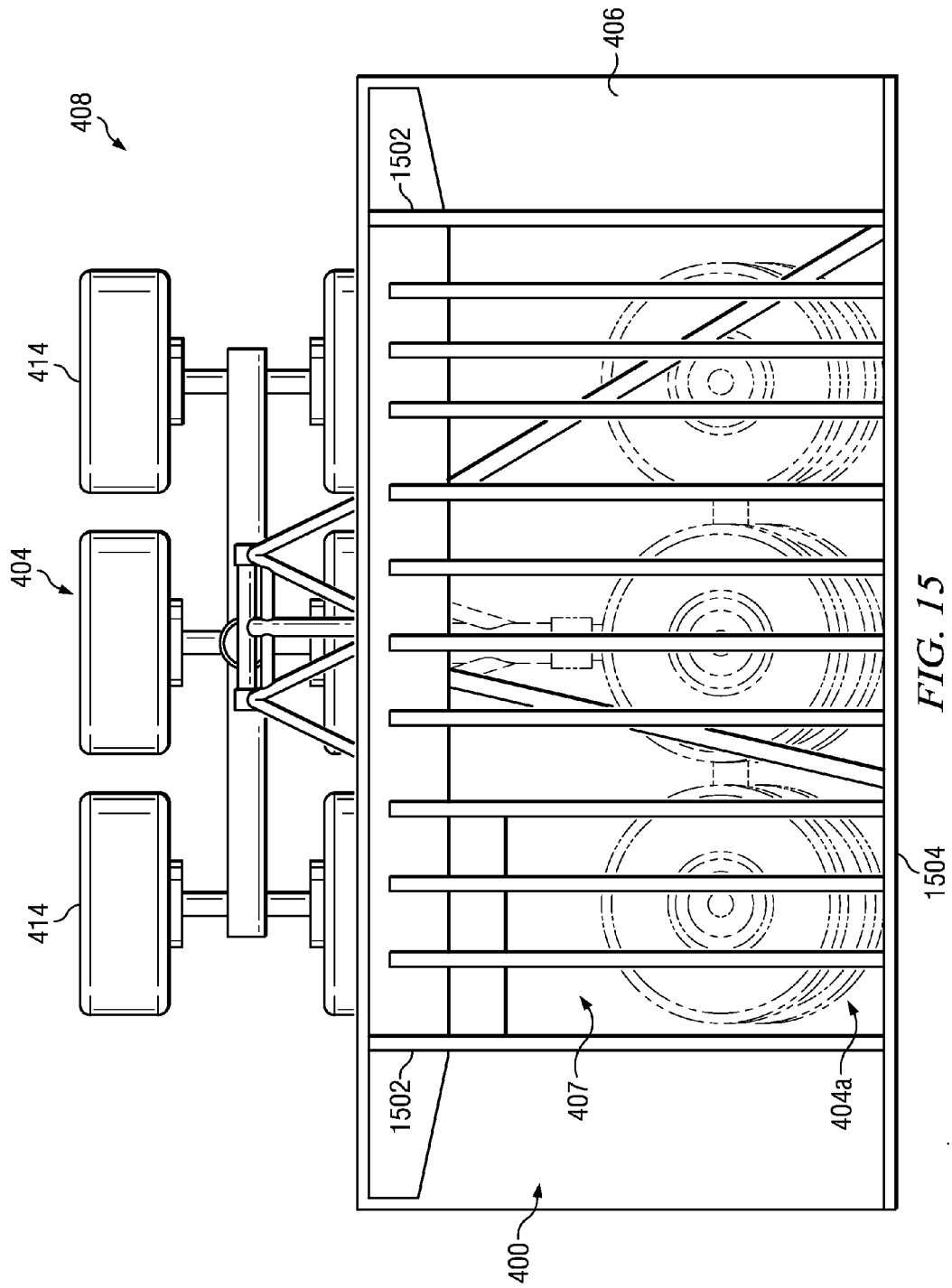
FIG. 15 is an illustration of a top plan view of the landing gear of FIGS. 4-6, showing the landing gear in both deployed and retracted positions in accordance with an advantageous embodiment.

FIG. 15 is an illustration of a top plan view of the landing gear of FIGS. 4-6, showing the landing gear in both deployed and retracted positions in accordance with an advantageous embodiment. FIG. 15 illustrates that for a landing gear such as landing gear 400, having a three-axle wheel/truck assembly, the size for the landing gear storage area 407 is determined primarily by the wheel/truck assembly 404 expanded as shown at 404a. The entire landing gear and the backup structure (the fixed structure to which the landing gear is attached) is completely contained within the forward and aft wheel well pressure bulkheads 1502, the keel beam 1504 and, if necessary, the fairing 900 (not shown in FIG. 15).

Figure 16:
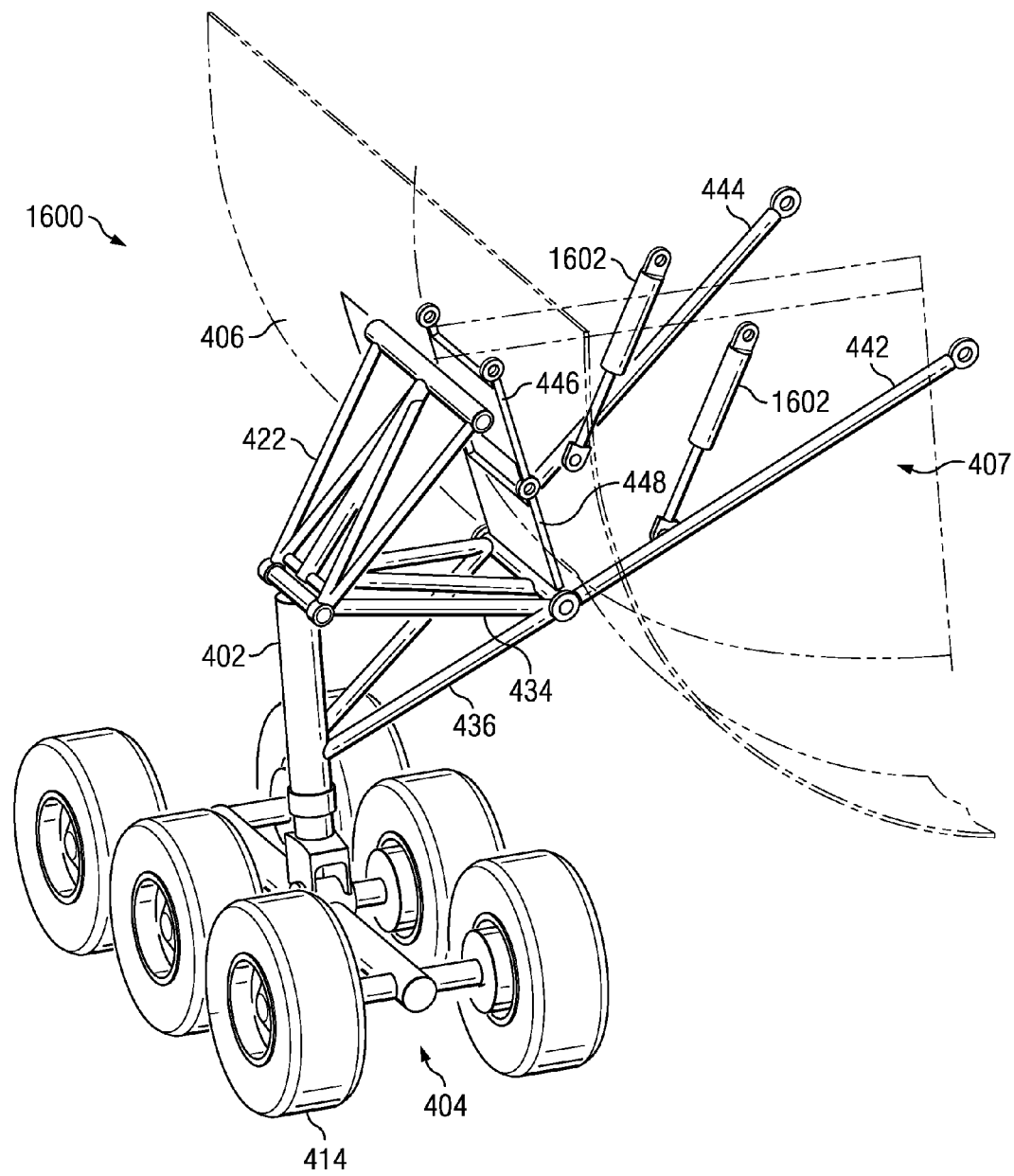
FIG. 16 is an illustration of a rear perspective view of a landing gear with an alternative actuation scheme for an aircraft in accordance with a further advantageous embodiment.

With reference now to FIG. 16, an illustration of a rear perspective view of a landing gear for an aircraft in accordance with a further advantageous embodiment is depicted. The landing gear is designated by reference number 1600, and differs from landing gear 400 in FIGS. 4-6 in that the main retract actuators 1602 are attached to fuselage 406 and to some point on drag brace 442 and the side brace 444 relative to the fuselage 406 retracting the landing gear well within the fuselage 406 when the lock links 446 and 448 are unlocked.

Figure 17:
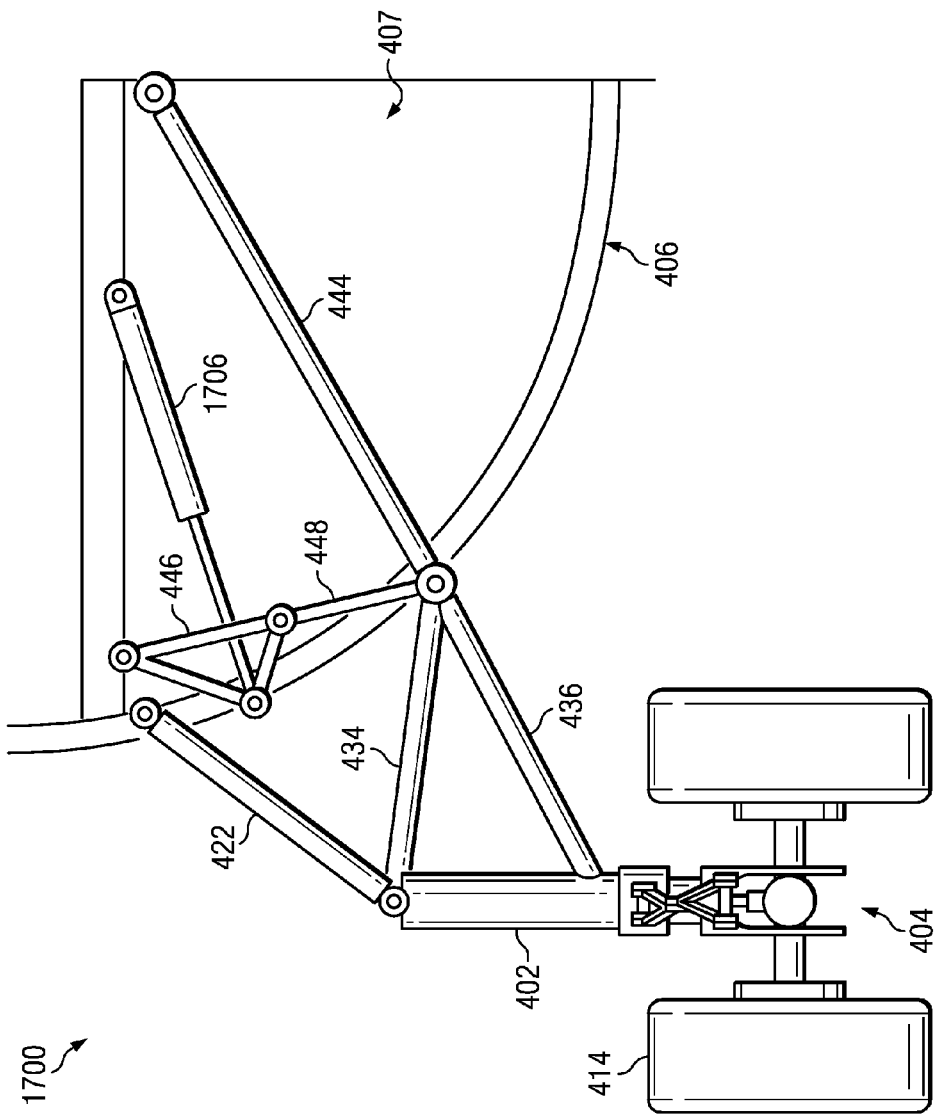
FIG. 17 is an illustration of a rear plan view of a landing gear with a further alternative actuation scheme for an aircraft in accordance with a further advantageous embodiment.

With reference now to FIG. 17, an illustration of a rear plan view of a landing gear for an aircraft in accordance with a further advantageous embodiment is depicted. Landing gear 1700 in FIG. 17 differs from landing gear 1600 in FIG. 16 in that main retract actuator 1706 directly rotates the upper lock link 446, which, in turn, rotates the lower lock link 448, which, in turn, retracts the landing gear 1700 well within the fuselage 406. In this advantageous embodiment, the upper pivot of main retract actuator 1706 is attached to structure of fuselage 406, and the lower pivot of the main retract actuator 1706 is attached to the upper lock link 446 offset outboard from the lock link.

In general, in all embodiments of landing gear described herein, the retract actuators and the upper and lower lock links can be designed either as independent forward and aft members, or as single piece parts where forward and aft members will be webbed or framed together. Also, for the retract actuators and the upper and lower lock links, the forward and aft members can be designed to be either symmetric or non-symmetric. The locking actuator, springs and other mechanisms for any of the lock link embodiments can be designed in many ways.

Figure 18:
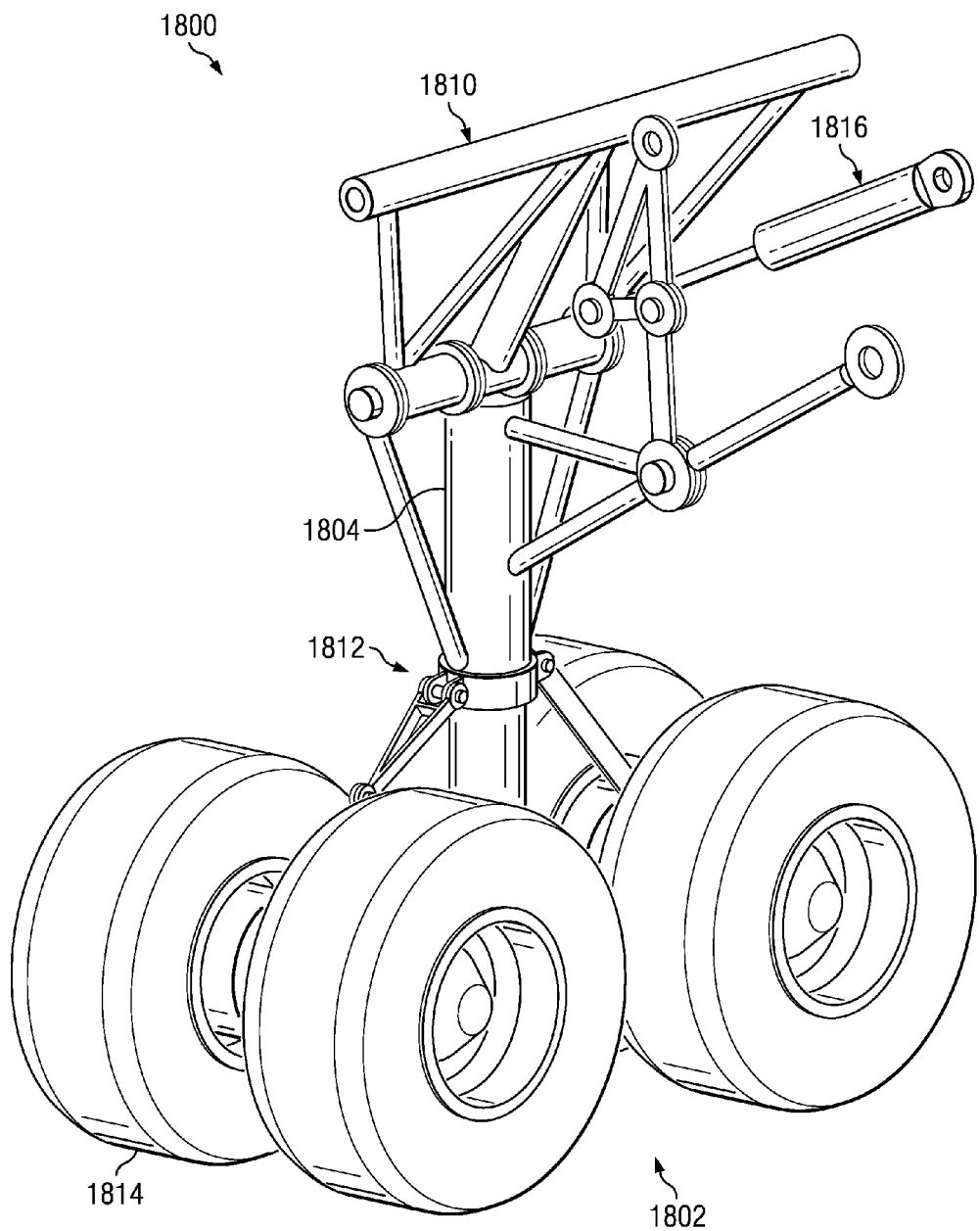
FIGS. 18 and 19 are illustrations that depict a two axle truck landing gear for an aircraft in accordance with a further advantageous embodiment.
Figure 19:
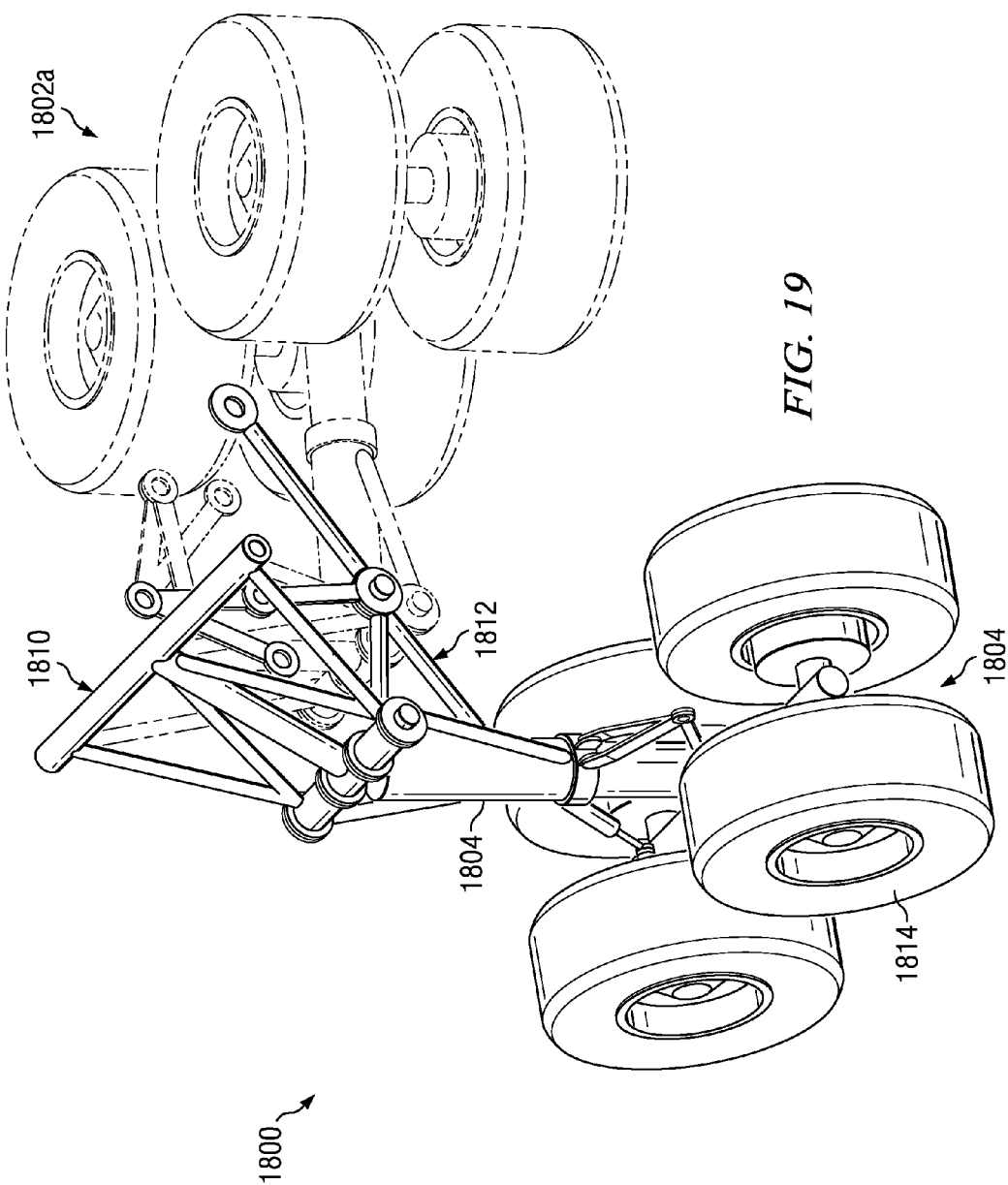

FIGS. 18 and 19 are illustrations depicting a two axle truck landing gear for an aircraft in accordance with a further advantageous embodiment. In particular, FIG. 18 is an illustration of a rear perspective view of a landing gear for an aircraft in a deployed position looking inwardly from the aircraft, and FIG. 19 is an illustration of a rear perspective view of the landing gear of FIG. 18 looking outwardly from the aircraft in both deployed and retracted positions.

FIGS. 18 and 19 specifically illustrate a landing gear 1800 for a truck assembly 1802 having four wheels 1814. In landing gear 1800, oleo strut/frame support 1804 is supported by a wide truss-type pivot beam 1810 to react to longitudinal loads. The yoked truss members in landing gear 400 in FIGS. 4-6 become a simple single set of truss members as shown at 1812. The entire retraction mechanism with a single actuator 1816 is aligned with the plane of the truss members 1812. A single axle, two axle or three axle truck landing gear support structure and actuation scheme can also be designed as shown in FIGS. 4-6 or as shown in FIG. 16.

Figure 20:
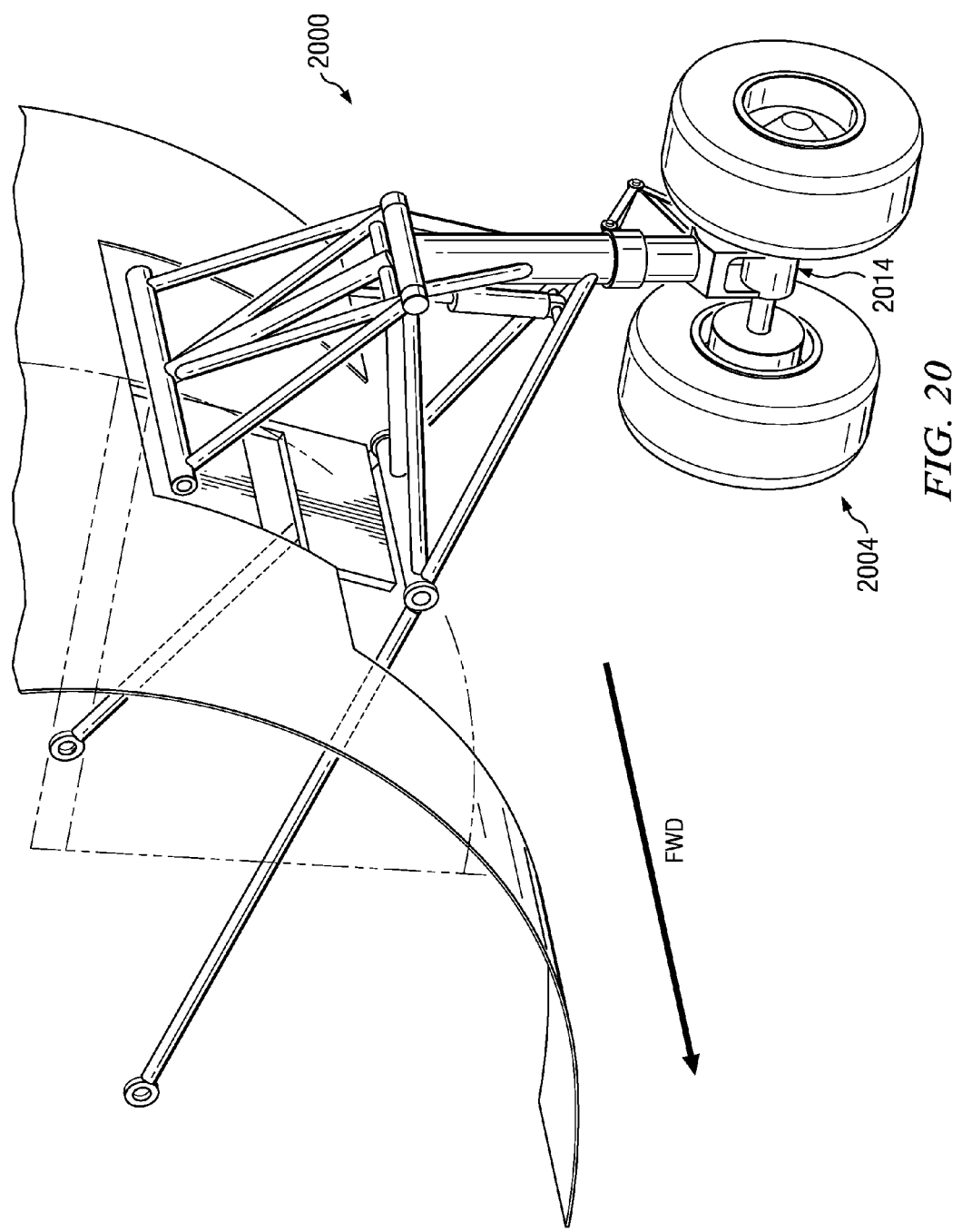
FIG. 20 is an illustration of a side perspective view of a landing gear for an aircraft in accordance with a further advantageous embodiment.

FIG. 20 is an illustration of a side perspective view of a landing gear for an aircraft in accordance with a further advantageous embodiment. In particular, FIG. 20 illustrates a landing gear 2000 for a truck assembly 2002 having one axle 2014. In landing gear 2000, the wheel axle can be shifted (i.e., positioned longitudinally on the ground to balance the aircraft) by making the oleo strut/support frame 2004 asymmetric in a longitudinal direction in order to optimize a center of gravity envelope for the aircraft design. In general, the landing gear for the single axle truck assembly does not differ from a landing gear for a four wheel or a six wheel truck assembly.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A landing gear for an aircraft, comprising:
a plurality of wheels connected to a number of axles forming a wheel/truck assembly;
an oleo strut configured to attach the wheel/truck assembly to a retraction assembly; and
the retraction assembly configured to move the landing gear between a deployed position and a retracted position, the retraction assembly including a pivoting trunnion brace having a first end and a second end, wherein the first end is attached to the oleo strut and the second end is attached to a fuselage of the aircraft, and wherein the trunnion brace is configured to position the wheel/truck assembly, the oleo strut, and the retraction assembly fully within the fuselage of the aircraft when in the retracted position.

2. The landing gear of claim 1, wherein the retraction assembly comprises a retract actuator connecting the first end of the pivoting trunnion brace to the oleo strut.

3. The landing gear of claim 2, wherein the retract actuator connects a first pivot point located on the pivoting trunnion brace and a second pivot point located on the oleo strut.

4. The landing gear of claim 1, wherein the oleo strut comprises a set of truss members configured to be supported by a drag brace and a side brace which are held on-center via a pair of folding lock links.

5. The landing gear of claim 1, wherein the retraction assembly comprises a drag brace configured to form a straight drag load path from the oleo strut to the fuselage, and a side brace configured to form a straight side load path from the oleo strut to the fuselage.

6. The landing gear of claim 5, wherein the retraction assembly comprises a four bar linkage with the oleo strut and the aircraft.

7. The landing gear of claim 6, wherein the aircraft comprises a first bar of the four bar linkage, the oleo strut comprises a second bar of the four bar linkage, the pivoting trunnion brace comprises a third bar of the four bar linkage, and a fourth bar of the four bar linkage is one of the drag brace or the side brace.

8. The landing gear of claim 7, wherein the retraction assembly further comprises a pair of folding lock links configured to stabilize the four bar linkage.

9. The landing gear of claim 1, wherein the number of axles forming the wheel/truck assembly comprises one of one axle, two axles, or three axles.

10. A landing gear for an aircraft, comprising:
   a plurality of wheels connected to a number of axles forming a wheel/truck assembly;
   an oleo strut configured to attach the wheel/truck assembly to a retraction assembly; and
   the retraction assembly configured to move the landing gear between a deployed position outwardly of a fuselage of the aircraft, and a retracted position, the retraction assembly including a pivoting trunnion brace having a first end and a second end, wherein the first end is attached to the oleo strut and the second end is attached to the fuselage, and wherein the trunnion brace is configured to position the wheel/truck assembly, the oleo strut, and the retraction assembly fully within the fuselage when in the retracted position.

11. The landing gear of claim 10, wherein the retraction assembly comprises a retract actuator connecting the first end of the pivoting trunnion brace to the oleo strut.

12. The landing gear of claim 10, wherein the retraction assembly comprises a drag brace configured to form a straight drag load path from the oleo strut to the fuselage, and a side brace configured to form a straight side load path from the oleo strut to the fuselage.

13. The landing gear of claim 12, wherein the retraction assembly comprises a four bar linkage with the oleo strut and the aircraft.

14. The landing gear of claim 13, wherein the aircraft comprises a first bar of the four bar linkage, the oleo strut comprises a second bar of the four bar linkage, the pivoting trunnion brace comprises a third bar of the four bar linkage, and a fourth bar of the four bar linkage is one of the drag brace or the side brace.

15. The landing gear of claim 10, wherein the number of axles forming the wheel/truck assembly comprises one of one axle, two axles, or three axles.

16. The landing gear of claim 10, wherein the aircraft comprises a wide body aircraft and wherein the wheel/truck assembly, the oleo strut, and the retraction assembly are fully within the fuselage of the aircraft when the landing gear is in the retracted position.

\* \* \* \* \*